United States Patent [19]

Longhurst

[11] Patent Number: 5,276,755
[45] Date of Patent: Jan. 4, 1994

[54] MULTI-PART OPTICAL FIBRE CONNECTORS

[75] Inventor: Philip C. Longhurst, Bunbury, England

[73] Assignee: BICC Public Limited, London, United Kingdom

[21] Appl. No.: 963,702

[22] Filed: Oct. 20, 1992

Related U.S. Application Data

[63] Continuation of Ser. No. 863,496, Mar. 30, 1992, Pat. No. 5,199,093, which is a continuation of Ser. No. 700,477, May 15, 1991, abandoned.

[51] Int. Cl.$^5$ .......................... G02B 6/00; G02B 6/36
[52] U.S. Cl. ...................................................... 385/88
[58] Field of Search ........................................ 385/88, 89

[56] References Cited

U.S. PATENT DOCUMENTS

| 4,167,303 | 9/1979 | Bowen et al. | 350/96.21 |
| 4,173,389 | 11/1979 | Curtis | 350/96.20 |
| 4,427,879 | 1/1984 | Becher et al. | 350/96.20 X |
| 4,611,886 | 9/1986 | Cline et al. | 350/96.20 |
| 4,650,278 | 3/1987 | Maciejko et al. | 385/73 |
| 4,762,388 | 8/1988 | Tanaka et al. | 350/96.20 |
| 4,840,451 | 2/1990 | Sampson et al. | 350/96.20 |
| 4,902,092 | 2/1990 | Grandy | 385/56 |
| 4,993,803 | 2/1991 | Suverison et al. | 350/96.20 |
| 5,076,654 | 12/1991 | Presby | 385/14 X |

FOREIGN PATENT DOCUMENTS

| 0216211 | 4/1987 | European Pat. Off. . |
| 0277390 | 8/1988 | European Pat. Off. . |
| 60-200210 | 3/1984 | Japan . |

Primary Examiner—Akm E. Ullah
Attorney, Agent, or Firm—Anthony J. Casella; Gerald E. Hespos

[57] ABSTRACT

An optical fiber connector-part comprises a housing in which an optical conductor extends between two oppositely disposed ends of the housing, at least one of which ends constitutes a plug or a socket. An integrated optical chip is disposed within the housing and constitutes a part of the optical conductor. Preferably, the housing is a molded plastics body and the integrated optical chip is at least partially encapsulated in the molded plastics material. The connector-part provides for ready reconfiguration of modularized optical systems.

2 Claims, 1 Drawing Sheet

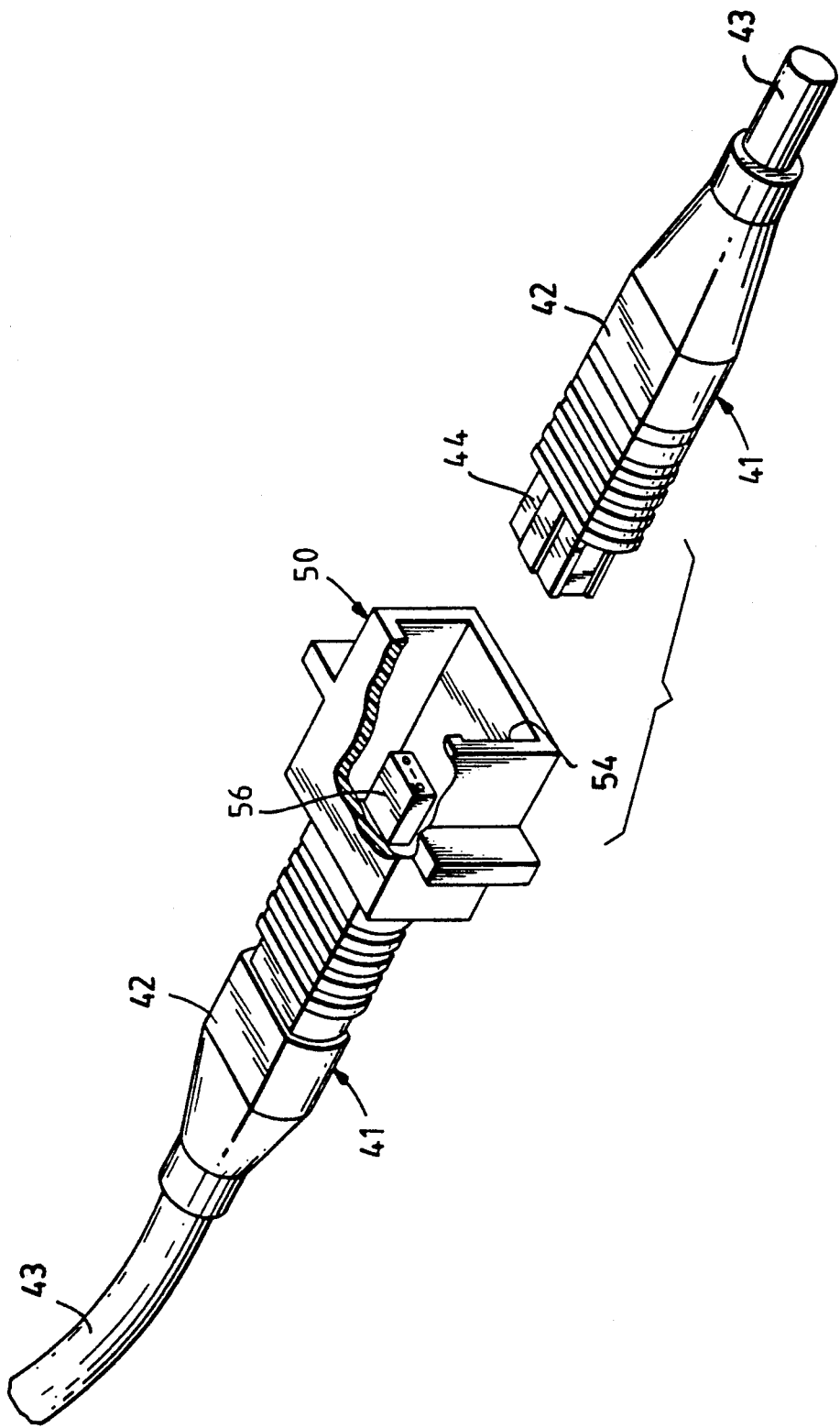

MULTI-PART OPTICAL FIBRE CONNECTORS

This application is continuation of 07/863,496 filed on Mar. 30, 1992, now U.S. Pat. No. 5,199,093, which is a continuation of 07/700,477 filed on May 15, 1991, now abandoned.

This invention relates to multi-part optical fibre connectors for detachably optically inter-connecting end-to-end at least two flexible optical guides each comprising at least one optical fibre. Such multi-part optical fibre connectors essentially comprise two separately formed connector-parts, each of which is adapted to be permanently or detachably secured to one of the flexible optical guides to be optically inter-connected, and may include at least one separately formed intermediate connector-part or adaptor for optically inter-connecting two separately formed connector parts. To facilitate detachable inter-connection of two separately formed optical fibre connector-parts, each connector part of a multi-part optical fibre connector constitutes at one or each of two oppositely disposed ends of the connector-part a plug or a socket adapted to effect a detachable plug and socket connection with a socket or a plug at an end of another connector-part. Multi-part optical fibre connectors of this kind are widely used in optical transmission systems.

It is an object of the present invention to provide, for use in a multi-part optical fibre connector of the aforesaid kind, an improved optical fibre connector-part which is of such a construction that an optical transmission system in which a multi-part optical fibre connector is inter-connected can be readily reconfigured or modified.

According to the invention, the improved optical fibre connector-part comprises a body of moulded plastics material having two oppositely disposed ends, each of which ends is shaped to make a disconnectable plug and socket connection with an end of another optical fibre connector-part, and at least one discrete passive integrated optical chip which is so permanently encapsulated within the moulded plastics material of the body that oppositely disposed faces of the chip are exposed at said shaped ends of the body and which provides at least one discrete optical part between said exposed faces of the chip.

The or each integrated optical chip may be designed to effect any one of a plurality of fibre-optic functions included among which are:
(i) a tree coupler constituting a cascaded series of Y-junctions;
(ii) a star coupler incorporating a mixing region intermediate of a plurality of input points and a plurality of output points;
(iii) a wavelength division multiplexer;
(iv) a full-duplex wavelength division multiplexer;
(v) an attenuating device;
(vi) an optical filter;
(vii) a phase modulator;
(viii) an access coupler, and
(ix) an optical Wheatstone bridge.

This list of functions which the or a discrete passive integrated optical chip of the improved optical fibre connector-part can serve is by no means exhaustive.

The or each passive integrated optical chip of the improved optical fibre connector-part may be a suitable discrete passive integrated optical chip obtained from any source. The body of the improved optical fibre connector-part may constitute at least one additional plug or socket for effecting a plug and socket connection with a socket or plug at an end of a further optical fibre connector-part.

The additional plug or socket or at least one of the additional plugs or sockets of the improved optical fibre connector-part may be disposed at one of the two oppositely disposed ends of the body of the connector-part or at a position intermediate of said two oppositely disposed ends.

It will be appreciated that the number of additional plugs or sockets constituted by the body of the improved optical fibre connector-part will be determined by the function of the or each discrete passive integrated optical chip encapsulated within the moulded plastics material of the body of the connector-part.

The invention also includes an improved multi-part optical fibre connector for detachably inter-connecting end-to-end at least two flexible optical guides each comprising at least one optical fibre, at least one of the connector-parts of the multi-part optical fibre connector being an improved optical fibre connector-part substantially as hereinbefore described.

The invention further includes a kit of parts for assembling an improved multi-part optical fibre connector as hereinbefore described, which kit of parts comprises at least two optical fibre connector-end parts each comprising a housing which at one of two oppositely disposed ends of the housing constitutes a plug or a socket and which at the other of said two oppositely disposed ends is adapted to be permanently or detachably secured to an end of at least one flexible optical guide comprising at least one optical fibre, and at least one optical conductor disposed within and extending between said two oppositely disposed ends of the housing; and at least two adaptors for optically inter-connecting two end parts, each adaptor comprising a body of moulded plastics material having two oppositely disposed ends each of which ends is shaped to make a disconnectable plug and socket connection with an end part, and at least one discrete passive integrated optical chip which is so permanently encapsulated within the moulded plastics material of the body that oppositely disposed faces of the chip are exposed at said shaped ends of the body and which provides at least one discrete optical path between said exposed faces of the chip, the discrete passive integrated optical chip of each adaptor differing from the discrete passive integrated optical chip of the other adaptor or of each of the other adaptors.

At least one of the optical fibre connector-end parts of the kit of parts may have as its housing a body of moulded plastics material and may have permanently optically connected in its optical conductor at least one discrete passive integrated optical chip for performing at least one passive fibre optic function, at least one permanent optical connection between said optical conductor and said optical chip being wholly encapsulated within the moulded plastics material of the body constituting the housing of said connector-end part and The improved optical fibre connector-part and the improved optical fibre connector of the present invention have the important advantage that an optical transmission system of any desired configuration can be readily assembled using one or more than one improved optical fibre connector-part incorporating at least one discrete passive integrated optical chip designed to effect a designed passive fibre optic function and that an existing optical transmission system can be readily reconfigured or modified by replacing one or more than one improved optical fibre connector-part inter-connected in the system with one or more than one improved optical fibre connector-part of which the or each discrete passive integrated optical chip is designed to effect a function differing from the function of the chip or chips of the connector-part being replaced.

The invention is further illustrated by a description, by way of example, of a preferred form of three-part optical fibre connector with reference to the accompanying diagrammatic drawing which is a partially exploded representation of the preferred connector.

Referring to the drawing, the preferred form of three-part optical fibre connector comprises optical fibre connector-end parts 41 and, adapted to optically interconnect the two optical fibre connector end parts, a mating adaptor 50. Each optical fibre connector and part 41 comprises a moulded plastics body 42 in one of two oppositely disposed ends of which is encapsulated an end of a multi-fibre optical cable 43, the other end 44 of the moulded body constituting a plug. Encapsulated in the plug 44 each optical fibre connector-end part 41 is a moulded array connector (not shown) in an exposed end face of which are exposed end faces of a plurality of optical fibres optically connected to the optical fibres of the optical cable 43. The axes of the exposed end faces of the optical fibres of the moulded array connector lie in a substantially common plane. The mating adaptor 50 is a body of moulded plastics material and has wholly encapsulated in the moulded plastics material intermediate of oppositely disposed sockets 54 of the adaptor adapted to effect plug and socket connections with the plugs 44 of the optical fibre connector end parts 41, discrete passive integrated optical chip 56 in each of two oppositely disposed end faces of which are exposed the end faces of a plurality of optical guides with the axes of the guides lying in a common plane. The discrete passive integrated optical chip 56 may be designed to effect any one of the plurality of fibre-optic functions hereinbefore recited. The arrangement is such that, when the plugs 44 of the optical fibre connector-end parts 41 effect plug and socket connections in the sockets 54 at the opposite ends of the mating adaptor 50, the exposed end faces of the moulded array connectors encapsulated in the plugs abut the oppositely disposed end faces of the discrete passive integrated optical chip 56 with the end faces of the optical fibres of the moulded array connectors and the end faces of the optical guides of the integrated optical chip being in axial alignment.

What I claim as my invention is:

1. A kit of parts for assembling a multi-part optical fibre connector, which kit of parts comprises at least two optical fibre connector-end parts each comprising a housing having two oppositely disposed ends, one of which ends is adapted to make plug and socket connection with an end of another optical fibre connector-part and the other of which ends is adapted to be secured to an end of at least one flexible optical guide comprising at least one optical fibre, and at least one optical conductor disposed within and extending between said two oppositely disposed ends of the housing of the end part; and at least two adapters for optically interconnecting two end parts, each adaptor comprising a body of moulded plastics material having two oppositely disposed ends, each of which ends is shaped to make a disconnectable plug and socket connection with an end part, and at least one discrete passive integrated optical chip which is so permanently encapsulated within the moulded plastics material of the body that oppositely disposed faces of the chip are exposed at said shaped ends of the body and which provides at least one discrete optical path between said exposed faces of the chip, the discrete passive integrated optical chip of each adaptor differing from the discrete passive integrated optical chip of the other adaptor or of each of the other adapters.

2. A kit of parts as claims in claim 1, wherein at least one of the optical fibre connector-end parts has as its housing a body of moulded plastics material and has permanently optically connected in its optical conductor at least one discrete passive integrated optical chip for performing at least one passive fibre optic function, at least one permanent optical connection between said optical conductor and said optical chip being wholly encapsulated within the moulded plastics material of the body constituting the housing of said connector-end part.

* * * * *